W. D. SMITH.
TOOL POST.
APPLICATION FILED JULY 16, 1908.
972,582.
Patented Oct. 11, 1910.
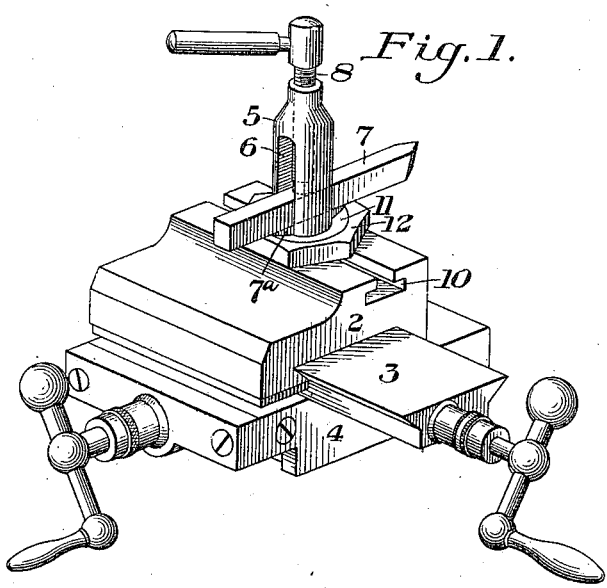
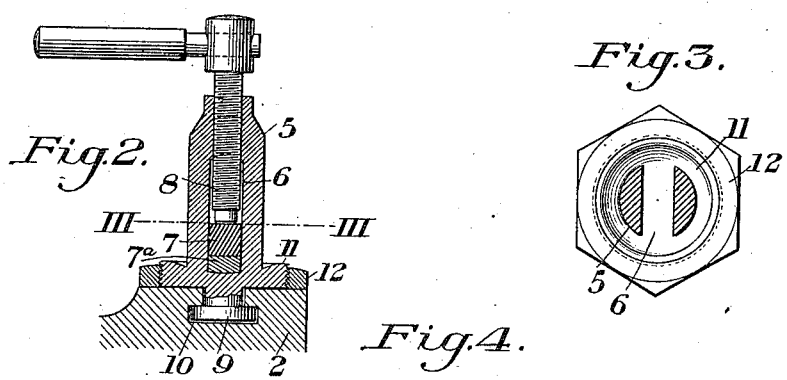
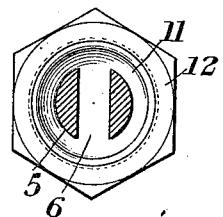
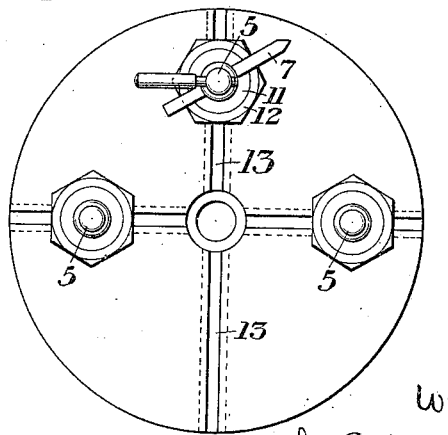
WITNESSES
R A Balderson
W. W. Swartz
INVENTOR
Wm D. Smith,
by Bakewell, Byrnes & Parmelee,
his Attys.

UNITED STATES PATENT OFFICE.

WILLIAM D. SMITH, OF DENVER, COLORADO.

TOOL-POST.

972,582.  Specification of Letters Patent.  Patented Oct. 11, 1910.

Application filed July 16, 1908. Serial No. 443,917.

*To all whom it may concern:*

Be it known that I, WILLIAM D. SMITH, of Denver, in the county of Denver and State of Colorado, have invented a new and useful Tool-Post, of which the following is a full, clear, and exact description, reference being had to the accompanying drawings, forming part of this specification, in which—

Figure 1 is a perspective view, showing my invention applied to a lathe slide rest; Fig. 2 is a sectional view of the tool post; Fig. 3 is a section on the line III—III of Fig. 2, with the tool removed, and Fig. 4 is a plan view, showing the tool post as applied to a lathe turret.

My invention has relation to a tool post, and is designed to provide a simple and convenient tool post, by means of which adjustment may be readily made to permit the tool to be set at any desired angle without changing the set of the tool.

My invention also provides a tool rest which can be readily removed to permit the tool to be ground or sharpened without removing the tool from the post, and without disturbing its set.

My invention is applicable to various forms of lathes of all sizes, but is of particular advantage in connection with small lathes used for fine work, such as watchmaker's lathes, in which, owing to the extremely fine and delicate nature of the work, the correct setting of the tool is a matter of considerable time and difficulty. My invention, by providing a tool post which can be adjusted to vary the angle of the tool, and which can be removed with the tool for sharpening as above described, without disturbing the set of the tool, overcomes this difficulty.

The precise nature of my invention will be best understood by reference to the accompanying drawings, which will now be described, it being premised, however, that various changes may be made in the details thereof, without departing from the spirit and scope as defined in the appended claims.

In these drawings, the numerals 2, 3 and 4 designate the three slides of a three-slide lathe rest.

5 designates the tool post, which is provided with a through-slot 6, in which the tool 7 is inserted and clamped in its set position by means of the clamping screw 8, having a threaded bearing extending vertically through the upper portion of the post, and opening into the slot 6. The lower end of the tool post is formed with an enlarged head 9, which is adapted to have a sliding engagement with a longitudinally extending undercut T-groove 10, formed in the upper portion of the top slide 2. Above the head 9 and below the slot 6, the post is provided with a circular portion 11 of enlarged diameter formed with an exterior screw-thread to receive a clamping nut 12. This nut may, as shown, be of hexagonal form to be engaged by a suitable wrench, or it may be provided with a milled circumferential edge, or with other means, for its convenient operation.

The head 9 of the post being engaged with the undercut groove 10, the post is adjusted to the proper position lengthwise of the slide, and with the tool at the proper angle and set. The nut 12 is tightened and thereby securely clamps the post in its adjusted position. If at any time it becomes necessary to change the angle of the tool, this may be readily done by loosening the nut 12 and turning the post to give the tool the desired angle; or, by loosening this nut, the tool post and tool can be bodily removed from the slide rest and the tool ground or sharpened, without in any way disturbing its previous set. It will be noted that the tool post is fixed, in so far as vertical adjustment is concerned. The elevation of the nose of the tool is controlled by the rocker 7ª, upon which the tool is seated, and against which it is clamped by the screw 8. This rocker has a convex under surface fitting the concaved bottom wall of the slot 6.

In Fig. 4 I have shown my improved tool post as applied to a turret lathe, the construction and operation being the same as already described, except that the headed end 9 of the tool post is inserted and clamped in a radial slot 13 of the turret, instead of in the slot of the slide. This enables the plurality of different tools to be mounted on the turret and brought into and out of operation as may be desired, without disturbing the previously adjusted set of any tool.

The advantages of my invention will be readily appreciated by those skilled in the art. It not only has the advantages above stated, but its construction is an extremely simple one, and one which requires but little space, and it is also free from any parts of a nature to interfere with free access to the tool or which are in the way of the workman.

It will be obvious that my improved tool post is applicable to various forms of slide rests and turrets, and also to various kinds of tool supports in different classes of metal working machinery. The details of construction and arrangement, and the manner of seating and securing the tool in the post may also be varied without departing from my invention.

I claim:—

1. A lathe tool comprising a slide rest having a slot in its upper surface, a tool post having a head arranged to be seated in the slot in the slide rest, screw threads on the tool post, a nut engaging the screw threads and arranged to secure the tool post to the slide rest, a slot in the tool post arranged to receive a cutting tool extending transversely with relation to the tool post, and means in the end of the tool post to secure the tool in its adjusted position; substantially as described.

2. A lathe tool comprising a slide rest having a slot in the upper face thereof, a tool post having a headed lower end adapted to engage said slot, a vertical tool slot extending through the tool post, a rocker seated in the bottom of the tool slot, a set screw extending through the end of the tool post and arranged to clamp the tool in the slot in the tool post, an enlarged screw threaded head on the tool post below the slot therein and above the upper surface of the slide rest, and a nut arranged to engage the screw threads to clamp the tool post in its position on the slide rest; substantially as described.

In testimony whereof, I have hereunto set my hand.

WILLIAM D. SMITH.

Witnesses:
H. M. CORWIN,
GEO. H. PARMELEE.